United States Patent [19]
Boyle

[11] Patent Number: 5,864,854
[45] Date of Patent: Jan. 26, 1999

[54] SYSTEM AND METHOD FOR MAINTAINING A SHARED CACHE LOOK-UP TABLE

[75] Inventor: Douglas B. Boyle, Palo Alto, Calif.

[73] Assignee: LSI Logic Corporation, Milpitas, Calif.

[21] Appl. No.: 583,334

[22] Filed: Jan. 5, 1996

[51] Int. Cl.[6] .................................................. G06F 17/30
[52] U.S. Cl. ........................... 707/10; 707/2; 711/206; 711/141; 711/121; 711/144; 711/159; 711/133; 395/872; 395/865; 364/242.94; 364/243.41
[58] Field of Search .................................... 395/610, 865, 395/872, 800.28; 711/206, 141, 144, 133, 121, 159; 364/242.94, 243.41; 707/2, 10

[56] References Cited

U.S. PATENT DOCUMENTS

| | | | |
|---|---|---|---|
| 4,648,036 | 3/1987 | Gallant ..................................... | 364/300 |
| 4,897,781 | 1/1990 | Chang et al. ............................ | 364/200 |
| 5,146,580 | 9/1992 | Naidu et al. ............................. | 395/425 |
| 5,151,989 | 9/1992 | Johnson et al. ......................... | 395/600 |
| 5,226,159 | 7/1993 | Henson et al. .......................... | 395/650 |
| 5,261,051 | 11/1993 | Masden et al. ......................... | 395/200 |
| 5,274,789 | 12/1993 | Costa et al. ............................. | 395/425 |
| 5,559,984 | 9/1996 | Nakano et al. .......................... | 395/448 |
| 5,581,704 | 12/1996 | Barbara et al. ..................... | 395/200.09 |
| 5,584,017 | 12/1996 | Pierce et al. ............................ | 395/473 |
| 5,586,310 | 12/1996 | Sharman ................................. | 395/600 |

OTHER PUBLICATIONS

Stumm et al. "Algorithms implementing distributed shared memory" Computer, IEEE, pp. 54–64, May 1990.

"The S3.mp Scalable Shared Memory Multiprocessor," A. Nowatzyk et al., *Proceedings of the 1995 International Conference on Parallel Processing*, p. 3, vol. (XV+218+221+223), I/1–10, vol. 1 (1995).

"Serverless Network File Systems," T.E. Anderson et al., *15th ACM Symposium on Operating Systems Principles* (Dec. 1995).

*Primary Examiner*—Thomas G. Black
*Assistant Examiner*—Jean M. Corrielus
*Attorney, Agent, or Firm*—Westman, Champlin & Kelly

[57] ABSTRACT

An information system and method for reducing workload load on servers in an information system network. The system defines a group of interconnected clients which have associated cache memories. The system maintains a shared group cache look-up table for the group having entries which identify data items cached by the clients within the group and identify the clients at which the data items are cached. Each client in the group has access to the group cache look-up table, and any client or group can cache any data item. The system can include a hierarchy of groups, with each group having a group cache look-up table. The group cache look-up tables minimize requests for data items outside the groups and greatly minimize the service load on servers having popular data items.

27 Claims, 4 Drawing Sheets

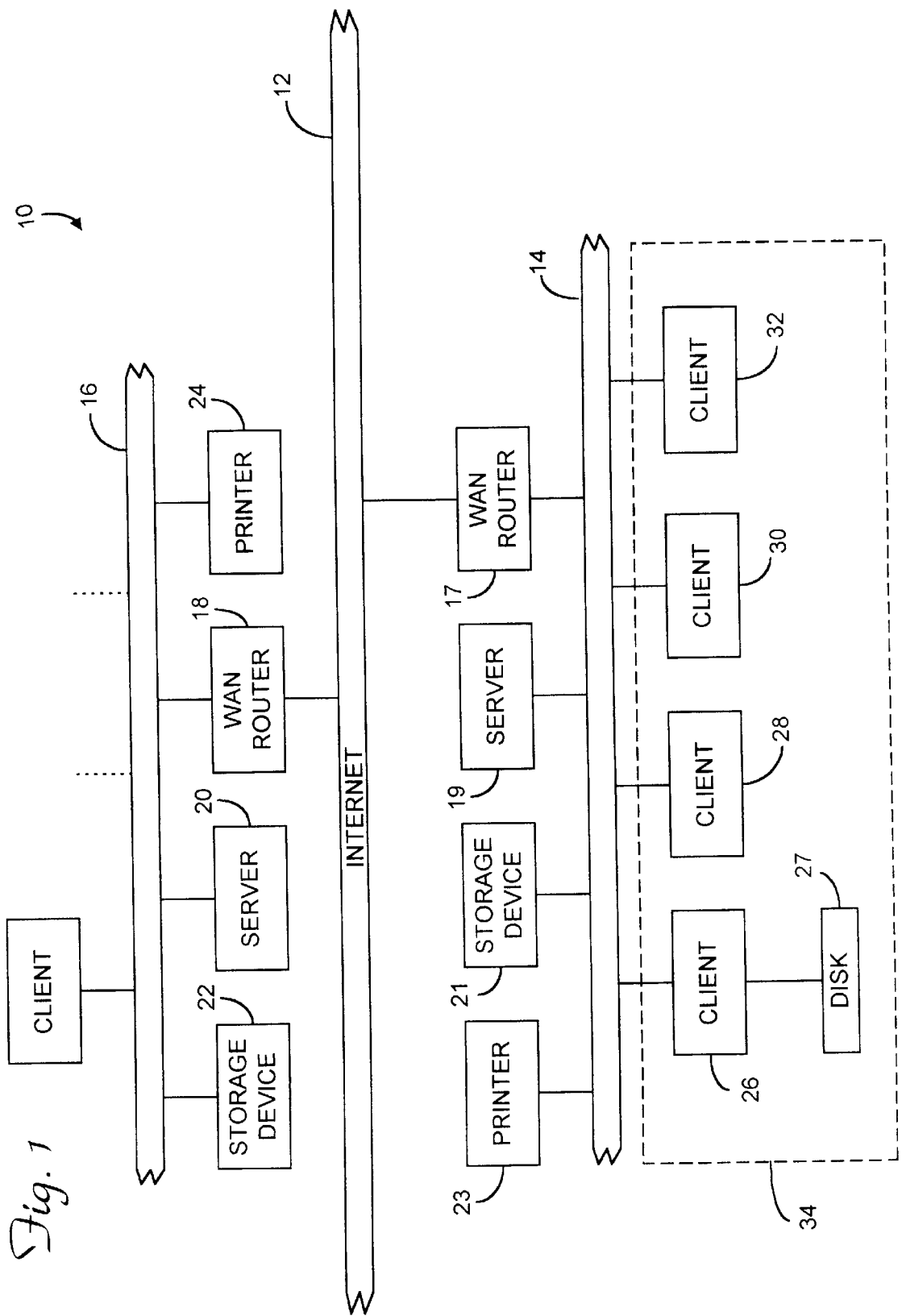

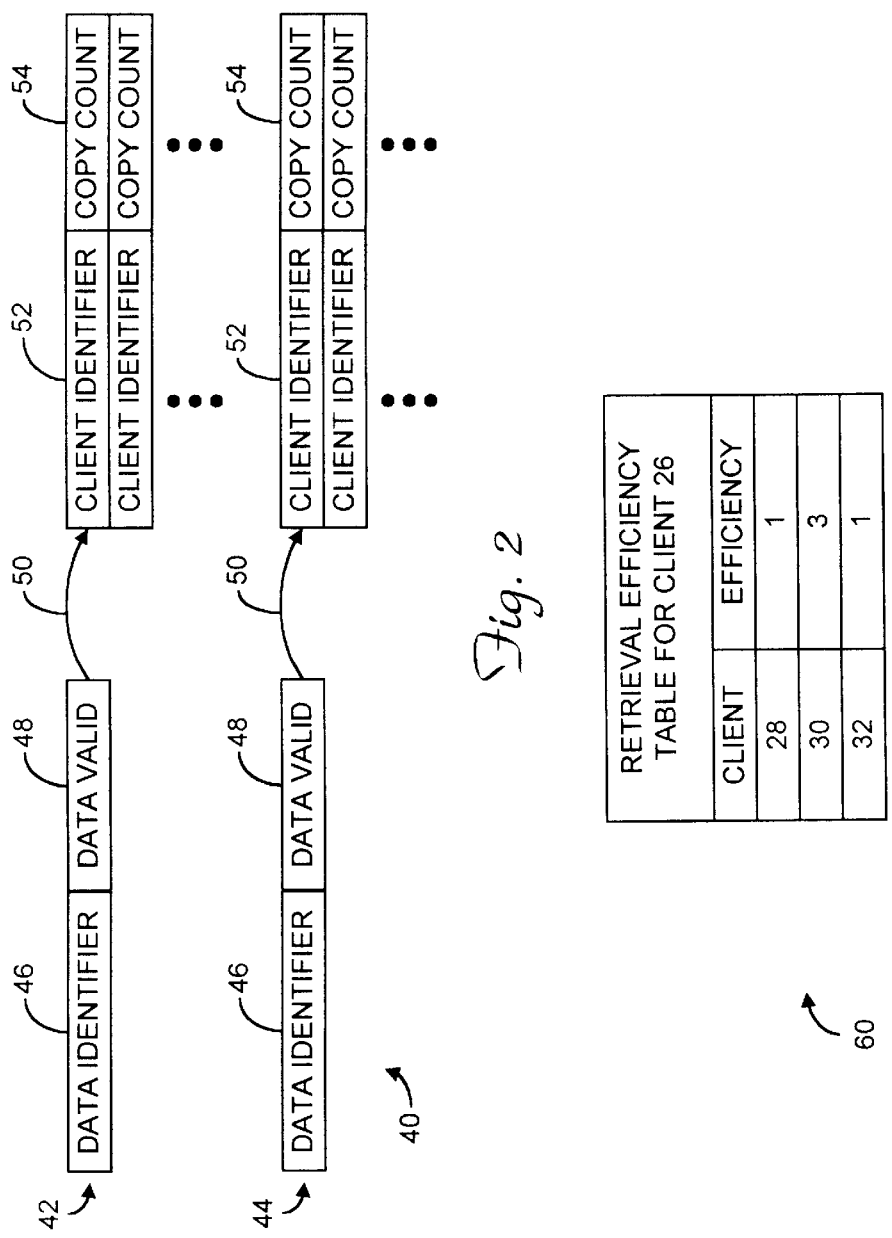

SYSTEM AND METHOD FOR MAINTAINING A SHARED CACHE LOOK-UP TABLE

BACKGROUND OF THE INVENTION

The present invention relates to a system and method for combining requests for data in an information system and, more particularly, to a system having a shared cache look-up table within groups of information appliances.

In conventional information systems, such as a distributed file system or the World Wide Web, requests for data items are directed to a server. If multiple requests are made at approximately the same time, the server becomes a bottleneck and subsequent requests queue up until the server can complete current requests. Each user perceives an increased latency and a degradation of system performance. For example, when the Shoemaker-Levy comet collided with Jupiter, many requests were made for the image data of the collision and the latency for providing the data was very long, or requests for the data were simply refused.

A server's performance can be increased by using a faster processor (or processors) and by increasing the bandwidth of the interconnect to the server. However, this can be expensive and, especially in the case of a transient event, not feasible to implement. In large distributed information systems, the aggregate demand for bandwidth of all the potential users (called "clients" in "client-server" systems) is enormous and cannot be satisfied by any single current server machine.

In certain systems, the demand for data is continuous such as in a distributed file system which serves the binary code of a commonly used application. In other systems, the demand for data can be predicted sufficiently far in advance, such as when Netscape distributes the latest version of its Internet browser. In these situations, multiple servers can be set up, typically distributed to be near the expected sources of the requests. In this approach, the users distribute their requests to all of the servers, so that there is no single bottleneck and each server receives only its share of requests. The user or system administrator manually attempts to select a relatively lightly loaded server to get low-latency service of the requests. Setting up the servers can be labor intensive and the users may find it undesirable to have to select a server.

In one proposed system, the server is "removed" by distributing its functions, such as storage, cache and control, over cooperating work stations. T. Anderson et al., *Serverless Network File Systems*, Computer Science Division, University of California at Berkeley, 15th ACM Symposium on Operating System Principles (December 1995). The server cache is replaced by cooperative caching which is implemented by forwarding data among client caches under control of managers. A globally replicated manager map indicates which manager (and the physical machine on which it is running) manages which groups of file index numbers. A file is read by using the manager map to locate the correct manager for the index number and sending a request for the file to that manager. Even with this distributed system, a particular manager can become a bottleneck if multiple requests for a particular data item are made at approximately the same time.

SUMMARY OF THE INVENTION

The information system and method of the present invention reduce workload on servers by combining requests for data and by distributing replication of data. The system includes a group of interconnected clients which have associated cache memories and a shared group cache look-up table. The look-up table has entries which identify data items cached by the clients within the group and which identify the clients at which the data items are cached. Each client in the group has access to the group cache look-up table. The performance of each client typically improves as the group grows to include more clients, since data items can be obtained more quickly from another client in the group than from a server.

In one embodiment, the system includes a hierarchy of groups, with each group having a group cache look-up table. The group cache look-up tables for the higher level groups are preferably implemented in and distributed among the clients in the lowest level groups. The group cache look-up tables minimize requests for data items outside each group and minimize the service load on servers having popular data items.

BRIEF DESCRIPTION OF THE DRAWINGS

FIG. 1 is a diagram of an information system having a group of interconnected information appliances in accordance with the present invention.

FIG. 2 is a diagram of a group cache look-up table for the group shown in FIG. 1.

FIG. 3 is a diagram of a data item retrieval efficiency table in accordance with the present invention.

DETAILED DESCRIPTION OF THE PREFERRED EMBODIMENTS

Figure 4:
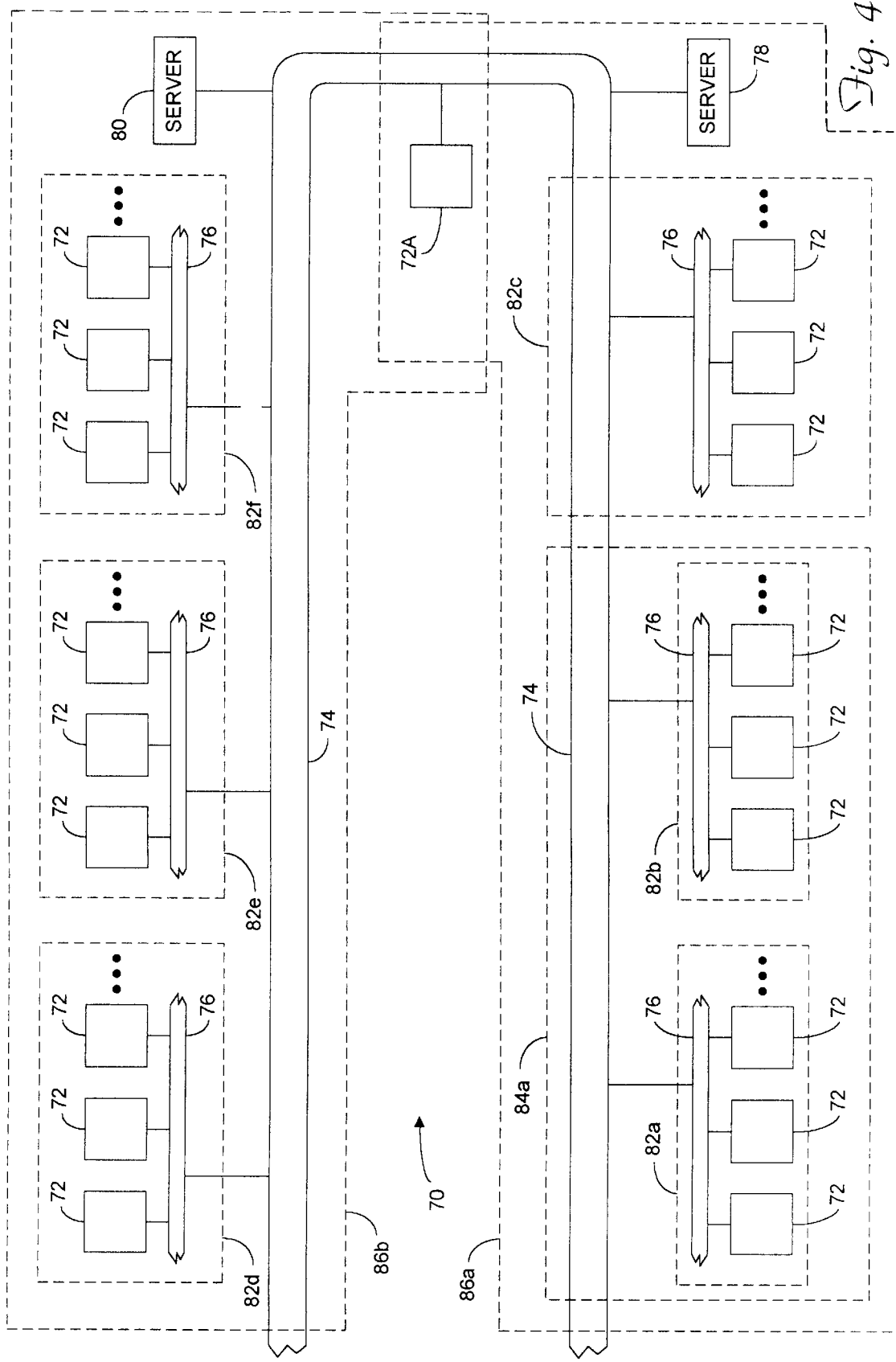
FIG. 4 is a diagram of a multi-group information system in accordance with the present invention.

The present invention is an information system comprising a plurality of interconnected information appliances or "clients" which are divided into groups with each group having a shared group cache look-up table. The group cache look-up tables combine requests for data and distribute the data so that the performance of the system as perceived by an individual user does not deteriorate when multiple users request the same data at approximately the same time. The present invention is especially useful and effective for distributed information systems in which the bandwidth between information appliances is very high.

FIG. 1 is a diagram of an information system according to one embodiment of the present invention. Information system 10 includes a wide area network (WAN) 12, such as the Internet, which interconnects local area networks (LAN's) 14 and 16 through WAN routers 17 and 18. Networks 14 and 16 include one or more servers 19 and 20, respectively, for controlling network resources such as storage devices 21 and 22 or printers 23 and 24. Networks 12, 14, and 16 can be implemented with various interconnect schemes, such as traditional networks or high speed interconnects for distributed shared memory systems.

A plurality of clients 26, 28, 30 and 32 are connected to network 14. Clients 26, 28, 30 and 32 communicate with one another and with WAN router 17, server 19, storage device 21 and printer 23 over network 14 through network software in a known manner. Clients 26, 28, 30 and 32 can include a variety of information appliances such as data processing systems, personal computers, workstations, computer based medical equipment, instrumentation equipment, control systems, communications systems and other computer based devices. One or more of the clients 26, 28, 30 and 32 can also include its own group of information appliances or a group of groups, as discussed in more detail below.

Each client is controlled by an operating system and one or more application programs, which may be stored in local random access memory (RAM) or a local or remote permanent storage media, such as a magnetic, optical or floppy disk 27. Either the operating system or the application program maintains a local cache memory in the RAM. Data items read from a local or remote storage media are kept in the local cache memory such that subsequent requests for the data items by the client are retrieved from the local cache. Retrieving data items from the local cache memory saves disk and network access delays.

In a conventional system, if client requires a particular data item that is not in its local cache memory, the client must direct a request for the data item to a local storage media or to a remote storage media over a local or wide area network. With the present invention, clients are logically grouped to combine requests for data items and to distribute replication of data items. For example, clients 26, 28, 30 and 32 are logically arranged in a group 34. Group 34 includes a group look-up table which is shared by clients 26, 28, 30 and 32. The group cache look-up table includes an entry corresponding to each data item cached by any member of the group. If the group look-up table contains an entry for the requested data item, then another member of the group has already made a request for that data item and the data item can be retrieved from the local cache memory of that member. If not, the request is forwarded to an associated disk, server 22 or WAN router 17.

In one embodiment, the group cache look-up table is replicated in the RAM memory of each client 26, 28, 30 and 32. However, the table is preferably distributed among clients 26, 28, 30 and 32 so that each client contributes computational and communication resources for implementing the table. The table can also be distributed among only a subset of the clients, or centralized in a server, while still obtaining some of the benefits of a group cache look-up table. The table can be distributed among the clients within the group in a variety of different ways. For example, the operating system or application program implementing the table allocates certain ranges of entries to certain clients. This range is dynamically updated as the group changes size. A hash table computes an index into the table. In another embodiment, the table is implemented as a linked list, for example. The table can have a fixed or dynamic size to balance the cost of the table against the cost of sending requests for data items outside of the group.

FIG. 2 is a diagram of a group cache look-up table according to one embodiment of the present invention. Group cache look-up table 40 includes a plurality of entries 42 and 44, with each entry corresponding to a data item cached within group 34. The entries within table 40 are replaced according to a suitable algorithm, such as a least recently used (LRU) algorithm.

Each entry includes a data identifier field 46, a data valid field 48, a pointer 50, a client identifier field 52 and a replication count field 54. Data identifier field 48 includes any identifier of a data item, such as an object handle, file name, path name, directory tree, web page, cache line, or World Wide Web URL, for example. Data valid field 48 includes a data valid bit which indicates whether the data item associated with the table entry is valid to maintain cache consistency. The data valid bit is invalidated by the operating system or the application program implementing the table whenever the memory location from which the data item originated is written to or modified. Any new copies of the data item must then be obtained from the original memory location. The data valid field may include other state information, such as pending requests to the server, as needed for the cache coherence protocol.

Pointer 50 points to a list 52 of clients in group 34 at which the data item identified by data identifier 46 is cached. If the data item is cached by more than one client in group 34, list 52 includes a client identifier for each client caching the data item. The client identifier can be implemented in a variety of ways, depending on the particular application in which the present invention is used. For a distributed shared memory (DSM) system, the client identifier includes a global memory location specifying a node number (e.g. client number) and address within the node at which the data item is stored.

In message-passing systems, the client identifier includes a network address for the client caching the data item. During a read operation, the client initiating the request retrieves the client identifier and passes a data item request to the client at which the data is cached to obtain a copy of the data item. The retrieved data item is then stored as a copy in the local cache of the client initiating the request.

If there is more than one client identifier in list 52 for the requested data item, the client that initiated the data request uses a selection algorithm to select a client for retrieving the data item. The selection algorithm is implemented in the client's operating system or application program. In one embodiment, the selection algorithm randomly selects a client from list 52 to balance the load on the clients within group 34 that cache the data item.

In another embodiment, each client in the group maintains a retrieval efficiency table having an efficiency indicator indicating the efficiency of retrieving data items from each of the other clients in the group. For example, FIG. 3 is a diagram of a retrieval efficiency table for client 26 according to one embodiment of the present invention. Table 60 has two columns. The first column lists the other clients within group 34. The second column lists the efficiency indicators for retrieving data from each of the other clients. For example, clients 28 and 32 have efficiency indicators of 1, while client 30 has an efficiency indicator of 3. Assuming a "1" indicates a higher efficiency than a "3", client 26 can retrieve the data item more efficiently from clients 28 and 32 than from client 30. The relative efficiency between clients in the group depends on a number of factors, including the load on each client, the location of the other clients with respect to the client initiating the data item request, and the network interconnecting the clients.

If two clients have the same efficiency indicator, one of those clients can be selected on a random basis, for example. Any efficiency indicator, weighting system or convention can be used in accordance with the present invention. The efficiency indicators can be static indicators or can be dynamically updated during operation based on monitored performance factors, such as data retrieval latency.

Retrieval efficiency table 60 optimizes performance of data item retrievals through group cache look-up table 40. In most groups, the efficiency or cost of retrieving a data item will not vary significantly from one client to the next since all clients are within the same vicinity, such as in the same building or campus, for example. However, higher level groups spanning one or more wide area network connections may include clients with significantly different access times. Therefore, the benefits of using a retrieval efficiency table may be more pronounced in higher level groups.

Referring back to FIG. 2, one of the clients identified in client identifier field 52 may include a subgroup of information appliances. Since each member of each group can cache any data item, the subgroup may have several copies of a data item distributed among various information appliances. Replication count field 54 indicates the number of copies of the data item that are cached within the client or subgroup identified in client identifier field 52. The replication count may represent the number of active copies of the data item and/or the cumulative number of copies of the data item (since a client may request a copy and then discard it). The replication counts are passed back to servers, such as server 22, for statistical or billing purposes. Preferably, the replication counts are combined along the way for each data item.

FIG. 4 is a diagram of a multi-group information system having a hierarchy of groups according to one embodiment of the present invention. Information system 70 includes a plurality of information appliances 72 connected to a wide area network 74 through local area networks 76. Information system 70 further includes servers 78 and 80 which are connected to wide area network 74.

Information appliances 72 are organized into a plurality of first level groups 82a, 82b, 82c, 82d, 82e and 82f. Each group 82a–82f has its own group cache look-up table which is shared among the clients within the group. The size of each group is a function of the computational and communications characteristics of each installation. A small, isolated cluster of machines with a shared link to the "rest of the world" (ROW) might form a natural group, such as group 82a. In a "campus" with many information appliances interconnected locally and with many links to the ROW, a logical hierarchy of groups is established. For example, if groups 82a and 82b are located on a campus, these groups form a natural second level group 84a. Second level group 84a has two "clients", groups 82a and 82b. Second level group 84a has a shared second level group cache look-up table, which is preferably distributed among the clients within first level groups 82a and 82b.

System 70 further includes groups 86a and 86b which may represent WAN connections to the south and north, respectively. Group 86a is a third level group which includes groups 84a and 82c, server 78 and client 72a. Group 86b is a second level group which includes groups 82d–82f, server 80 and client 72a. Groups 86a and 86b also have their own group cache look-up tables The computation and communication resources needed to implement the group look-up tables for the higher level groups are preferably provided by the information appliances in the lower level groups. For example, the group cache look-up table for group 86b is preferably distributed among the information appliances 72 within first level groups 82d–82f. Likewise, the group cache look-up table for group 86a is preferably distributed among the information appliances 72 within first level groups 82a–82c. In an alternative embodiment, the group cache look-up tables for the higher level groups are implemented on a server for that group, such as servers 78 and 80.

The number of members of a group at each level (i.e. the "fan in" of the hierarchy) is preferably selected such that the expected peak number of requests for any data item is not significantly delayed by queuing for the look-up table. Each information appliance or group can be a member of different groups for different data items to optimize latency or bandwidth based on typical data flow. For example, suppose group 86a represents clients on the south side of Stanford University campus, which includes a WAN connection to Los Angeles, and group 86b represents clients on the north side of Stanford University campus, which includes a WAN connection to Seattle. If information appliance 72a is located in the middle of Stanford University campus, it can be placed in group 86a for data items going to the south, and in group 86b for data items going to the north.

In a preferred embodiment, the client identifier field in the higher level group cache look-up tables does not list of all information appliances within in the subgroups at which the data is cached. Rather, the client identifier field lists only the name or address of the next lower subgroups in which the data item is cached. If a request for a data item is directed to a higher level group look-up table, the request is passed to a subgroup that is listed in the client identifier field of the higher level look-up table. The subgroup then looks at its own client identifier field in its group look-up table to locate a particular information appliance caching the data.

Copies of each data item are kept coherent in a preferred embodiment through known mechanisms such as directories used in DSM computer architectures. An example of a suitable DSM computer architecture is described in D. Lenoski and Wolf-Dietrich Weber, "Scalable Shared Memory Multiprocessors," Morgan Kaufmann (1995). Message-passing software or other mechanisms can also be used to keep copies of data items coherent. In a large system with many diverse users, security and integrity of data can be maintained through cryptographic techniques, if required. Centralized administrative control of all the information appliances is not required.

Figure 5:
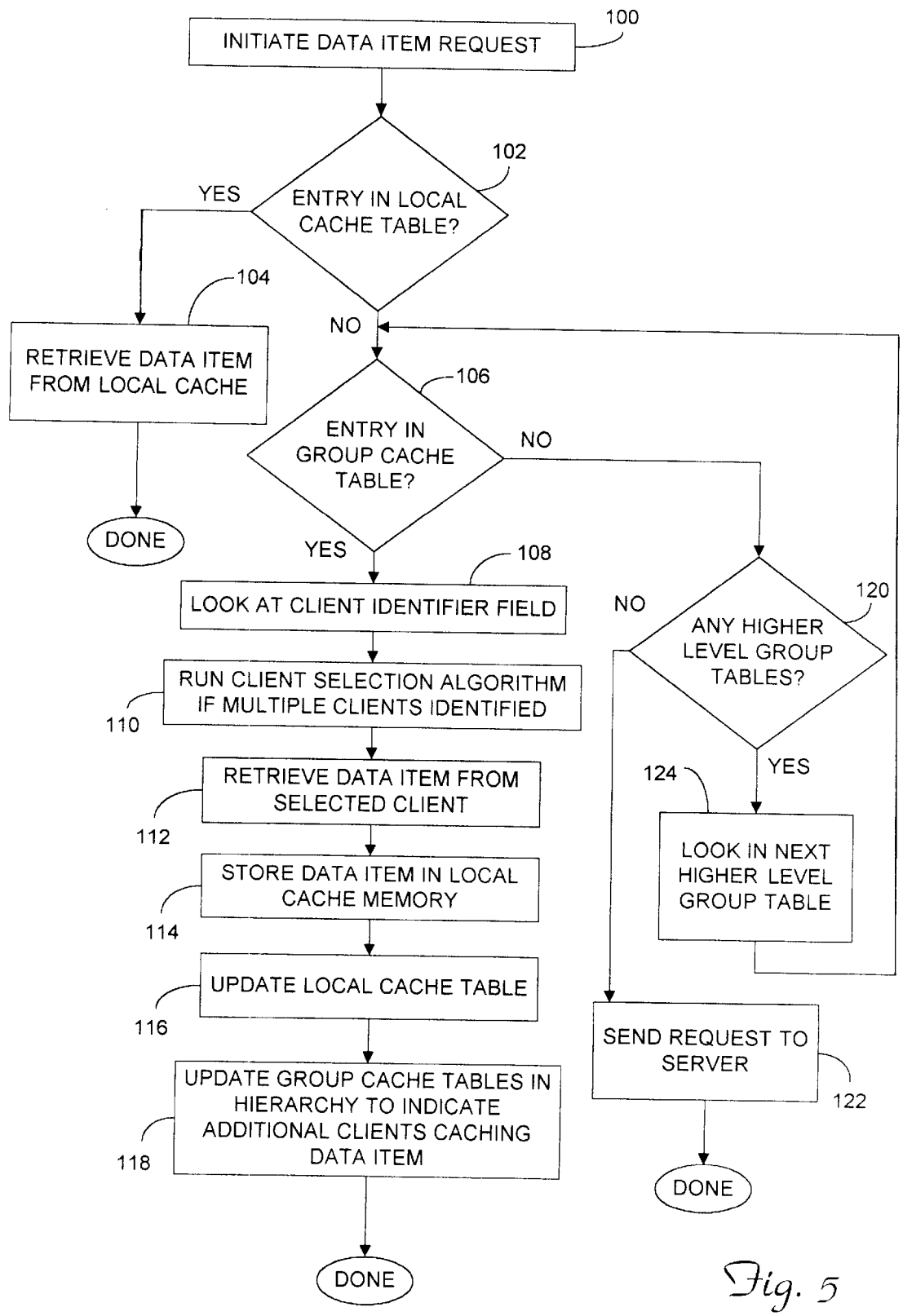
FIG. 5 is a flow chart illustrating an example of a read operation in the multi-group information system shown in FIG. 4.

FIG. 5 is a flow chart of a sample read operation performed by the multi-group information appliance shown in FIG. 4. An information appliance, such as one of the clients in first level group 82a, initiates a data item request at step 100. The information appliance first looks for an entry in its local cache look-up table, at step 102. If there is a data identifier corresponding to the requested data item in the local cache look-up table, then the information appliance initiating the request retrieves the data item from its local cache memory, at step 104, and the read operation is completed.

If there is no entry for the data item in the local cache look-up table, at step 102, the information appliance initiating the request looks in the group cache look-up table for first level group 82a, at step 106. If there is a data identifier corresponding to the requested data item in the group cache look-up table, then the information appliance initiating the request looks at the list of clients caching the requested data item, at step 108. If multiple clients are identified, the information appliance initiating the request runs the client selection algorithm, at step 110, and retrieves the data item from the selected client, at step 112.

The information appliance initiating the request stores the retrieved data item in its local cache memory, at step 114, and updates its local cache look-up table, at step 116, to indicate the data item is cached. The information appliance then updates the client identifier field of the group look-up table for group 82a, at step 118, to indicate an additional client caching the data.

If there is no corresponding data identifier in the group cache look-up table for group 82a, at step 106, the information appliance initiating the request determines whether there are any higher level group look-up tables, at step 120. If not, the client initiating the request directs the request to a server serving a storage device or to a wide area network router, at step 122.

If the information appliance initiating the request is a member of a higher level group, such as group 84a, the information appliance looks in the next higher level group cache look-up table, at step 124. If there is no entry in the next higher group cache look-up table, at step 106, the information appliance initiating the request continues to look in a next higher group cache look-up table, such as the table for group 86a, until a corresponding data entry is found or there are no higher group tables to look in. If an entry is found in a higher level table, at step 106, the information appliance initiating the request obtains the data item from one of the clients identified in the table in the same manner as was discussed above. In addition, once the data item has been retrieved, the information appliance initiating the request updates all of the group cache look-up tables for the groups of which the client is a member to indicate an additional member of the group has cached the data item. If more than one client in each group has cached the data item, then the replication count is incremented.

With a group hierarchy, a cache coherency routine invalidates copies of a cached data item by sending an invalidation message to each client listed as having copies of the data item. Each subgroup invalidates any corresponding entries in its group look-up table and forwards the invalidation message to each of the clients or subgroups listed in the client identifier field.

The group cache look-up tables and supporting algorithms can be implemented in software or hardware. A software implementation can include a computer program that is stored on a memory storage device, such as a magnetic disk, an optical disk or a floppy disk. The program can be incorporated into an operating system or an application program which runs on the information appliances in the system or can be "layered" on top of the operating system. For example, the program can form part of an Internet browser or be implemented within a Web Site server interface. In one embodiment, the group cache look-up table and the supporting functions are implemented in a software application that is configured to run on a DSM hardware environment, such as the one described in A. Nowatzyk et al., "The S3.mp Scalable Shared Memory Multiprocessor," Proceedings of the 1995 International Conference on Parallel Processing, p. 3, Vol. (XV+218+221+223), I/1–10, Vol. 1, (1995).

In a hardware application, the group tables and related support functions are implemented in digital integrated circuits which can be placed on a single Application Specific Integrated Circuit (ASIC) as part of a high performance interconnect to support a distributed shared memory environment.

The information system of the present invention and, in particular, the hierarchical nature of the group look-up tables establish an automatic mechanism for reducing the number of requests for data items that reach servers by combining the requests and by distributing replications of data items. This allows the effective performance of the system to scale with the number of information appliances in the system. Latency for servicing requests is reduced when multiple requests for the same data item are made at approximately the same time, since a local copy may be available at a lower latency than from the server.

The system of the present invention is especially useful and effective for systems in which the bandwidth to and from the information appliances is very high. In a system with a scalable high-bandwidth low-latency interconnect and a DSM architecture between the information appliances, the performance typically perceived by each user improves as the system grows larger, since there is an increase in the probability that a given data item is in a quickly accessible dynamic random access memory (DRAM), rather than on a disk or a remote server.

Although the present invention has been described with reference to preferred embodiments, workers skilled in the art will recognize that changes may be made in form and detail without departing from the spirit and scope of the invention. For example, the look-up tables can be implemented in a variety of ways and can be modified as desired to suit a particular application. Also, the local cache look-up tables can be eliminated, with each information appliance using only the shared group look-up tables. If both local and group cache look-up tables are used in a particular information appliance, the memory locations in RAM at which the identified data items are stored can be separate or shared between the tables.

What is claimed is:

1. A method of retrieving data items in an information system, the method comprising:

defining a group of interconnected clients within the information system, wherein the clients have cache memories;

maintaining a group cache look-up table for the group comprising entries of data identifiers which identify data items cached by the clients within the group and client identifiers which identify each client at which each of the identified data items are cached;

initiating a data item request with one of the clients within the group;

directing the data item request to the group cache look-up table; and retrieving the requested data item from the associated cache memory of any of the clients identified by the client identifiers if the requested data item has an associated data identifier entry in the group cache look-up table.

2. The method of claim 1 wherein:

the step of defining a group comprises defining a first level group of interconnected information appliances;

the step of maintaining a group cache look-up table comprises maintaining a first level group cache look-up table in which the client identifiers identify the information appliances within the first level group at which the data items are cached;

the step of initiating comprises initiating a data item request with one of the information appliances within the first level group;

the step of directing comprises directing the data item request to the first level group cache look-up table; and the step of retrieving comprises retrieving the requested data item from the associated cache memory of any one of the information appliances identified by the client identifier if the data item has an associated data identifier entry in the first level group cache look-up table.

3. The method of claim 2 and further comprising:

storing the requested data item in the cache memory of the information appliance initiating the data item request; and updating the entry in the first level group cache table associated with the requested data item to add a client identifier which identifies the information appliance initiating the data item request.

4. The method of claim 2 wherein the information system comprises a server and the method further comprises:

directing the data item request to the server if the requested data item has no associated data identifier entry in the first level group cache look-up table.

5. The method of claim 2 wherein the information appliances within the first level group have associated local cache look-up tables comprising local data identifier entries identifying data items cached in the associated cache memories and wherein the method further comprises:

directing the data item request to the local cache look-up table associated with the information appliance initiating the data item request;

retrieving the requested data item from the cache memory associated with the information appliance initiating the request if the data item has an associated data identifier entry in the local cache look-up table; and directing the data item request to the first level group cache look-up table if the data item has no local data identifier entry in the local cache look-up table.

6. The method of claim 2 and further comprising distributing the first level group look-up table among the information appliances within the first level group, with each information appliance having part of the first level group look-up table.

7. The method of claim 2 and further comprising maintaining a copy of the first level group cache look-up table in the cache memory of each information appliance in the first level group.

8. The method of claim 2 and further comprising:

defining a plurality of first level groups of interconnected information appliances;

maintaining a corresponding first level group cache look-up table for each of the plurality of first level groups;

defining a second level group comprising a set of the first level groups; and maintaining a second level group cache look-up table for the second level group.

9. The method of claim 8 wherein the step of maintaining a second level group cache look-up table comprises:

maintaining entries of second level data identifiers which identify data items cached within the second level group; and maintaining second level client identifier entries which identify the first level groups in the set within which the data items are cached.

10. The method of claim 8 and further comprising distributing the second level group cache look-up table among a plurality of the information appliances within the set of first level groups.

11. The method of claim 8 wherein one of the information appliances in the second level group comprises a server and wherein:

the step of maintaining a second level group cache look-up table comprises maintaining the second level group cache look-up table on the server.

12. The method of claim 8 wherein the step of defining a second level group comprises defining a plurality of second level groups and wherein the method further comprises:

defining a third level group comprising a set of the second level groups; and maintaining a third level group cache look-up table for the third level group.

13. The method of claim 8 where the step of defining a plurality of first level groups comprises including at least one of the information appliances in more than one first level group.

14. A data storage media storing a computer program adapted to program the group of information appliances to execute the method of claim 2.

15. The method of claim 1 wherein the group comprises a server and the step of maintaining a group cache look-up table comprises maintaining the group cache look-up table on the server.

16. The method of claim 1 wherein:

the step of defining a group comprises defining first and second groups of interconnected clients, wherein at least one of the interconnected clients is a member of both the first and second groups; and the step of maintaining a group cache look-up table comprises maintaining first and second group cache look-up tables for the first and second groups, respectively.

17. The method of claim 1 wherein maintaining a group cache look-up table comprises maintaining a data valid field associated with each data identifier.

18. The method of claim 1 wherein maintaining a group cache look-up table comprises maintaining a replication count field associated with each client identifier entry which indicates a count of copies of the associated data item in the identified client.

19. The method of claim 1 wherein:

the step of defining a group comprises defining a plurality of first level groups of clients and defining a second level group of clients, wherein at least one of the clients in the second level group comprises one of the first level groups.

20. The method of claim 1 and further comprising:

maintaining a data item retrieval efficiency table for each client in the group, wherein each efficiency table comprises an efficiency indicator corresponding to each of the other clients in the group, which indicates efficiency of retrieving data items from the client to which the efficiency indicator corresponds.

21. The method of claim 20 and further comprising:

initiating a data item request with one of the clients within the group;

directing the data item request to the group cache look-up table; and retrieving the requested data item from the client identified by the client identifier that has the highest efficiency indicator as compared to the efficiency indicators of the other clients identified by the client identifier if the data item has an associated data identifier in the group cache look-up table.

22. An information system comprising:

a plurality of clients having cache memory for caching data items;

an interconnect which interconnects the plurality of clients;

means for defining a group within the plurality of interconnected clients;

means for maintaining a group cache look-up table for the group which identifies data items cached by the clients within the group and identifies the clients at which each of the data items are cached; and means for directing a data item request to the group cache look-up table and for retrieving the requested data item from any of the clients identified by the group cache look-up table as caching the requested data item.

23. The information system of claim 22 wherein the plurality of clients comprises a plurality of information appliances.

24. The information system of claim 22 wherein:

at least one client within the group comprises a group of interconnected information appliances having a group cache look-up table which identifies data items cached by the information appliances.

25. The information system of claim 22 wherein:

at least one of the plurality of clients comprises an information appliance having a local cache memory; and the information appliance comprises a local cache look-up table having local data identifier entries identifying data items cached in the local cache memory.

26. The information system of claim 22 wherein:

the group cache table is distributed among the clients within the group.

27. A computer program having program code means for storing and retrieving data items in an information system comprising a plurality of client data processing systems having cache memories and interconnected by a communications link, the computer program comprising:

first program code means, in a first of the plurality of client data processing systems, for defining a group of the plurality of client data processing systems;

second program code means, in the first client data processing system, for maintaining at least a portion of a group cache look-up table for the group comprising entries of data identifiers which identify data items cached by the client data processing systems within the group and client identifiers which identify the client data processing systems at which the associated data items are cached;

third program code means, in the first client data processing system, for initiating a data item request;

fourth program code means, in the first client data processing system, for directing the data item request to the group cache look-up table; and fifth program code means, in the first client data processing system, for retrieving the requested data item from the cache memory of at least one of the client data processing systems identified by the client identifier if the data item has an associated data identifier entry in the group cache look-up table.

* * * * *